UNITED STATES PATENT OFFICE.

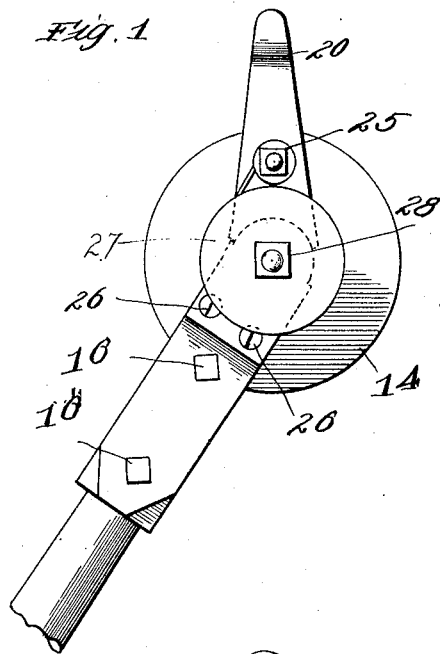
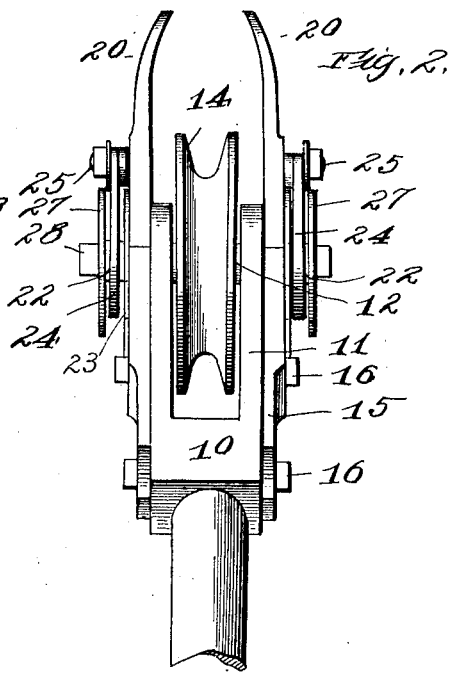
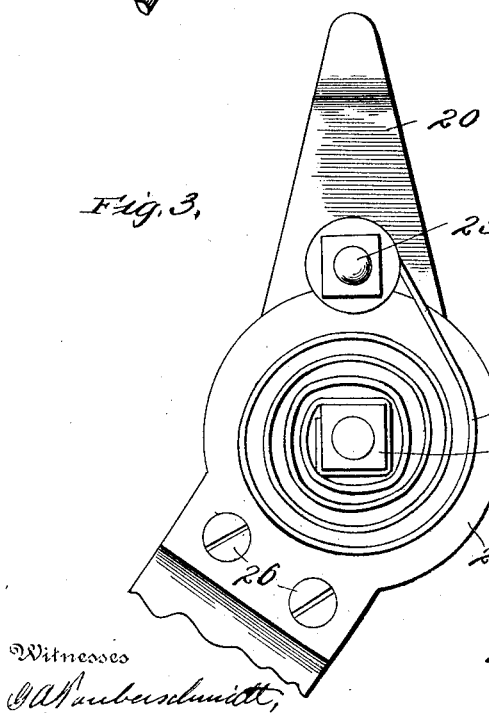
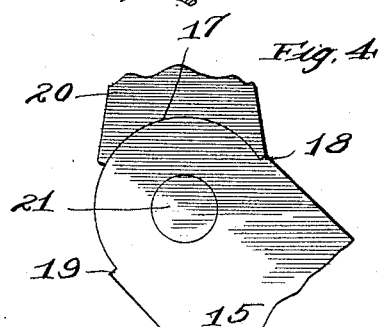
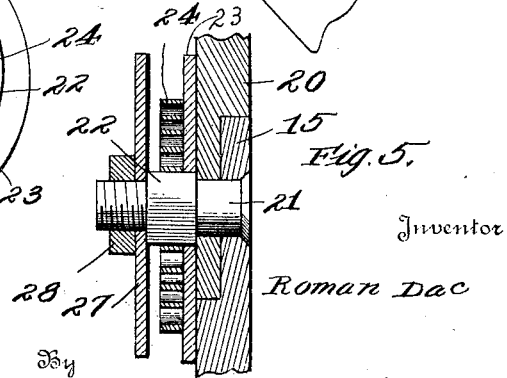

ROMAN DAC, OF PASSAIC, NEW JERSEY.

TROLLEY-GUARD.

1,100,542.  Specification of Letters Patent.  Patented June 16, 1914.

Application filed December 24, 1913. Serial No. 808,527.

*To all whom it may concern:*

Be it known that I, ROMAN DAC, a subject of the Emperor of Austria-Hungary, residing at Passaic, in the county of Passaic and State of New Jersey, have invented certain new and useful Improvements in Trolley-Guards, of which the following is a specification.

This invention relates to certain new and useful improvements in trolley guards, and has for its object the provision of means adapted to adjust itself automatically, so as to permit the trolley to pass beneath the wire upon which it is traveling.

The invention has for its further object to provide a trolley guard which may be readily attached to the ordinary trolley harp.

With the above and other objects in view, the invention resides in the novel construction, combination and arrangement of parts as will be hereinafter more specifically described and then claimed, and in describing the invention in detail, reference will be had to the accompanying drawings forming a part of this specification, and wherein like numerals of reference will be employed to designate like parts throughout the different views, in which:—

Figure 1 is a side view of a trolley harp and trolley wheel equipped with my invention. Fig. 2 is a front elevation of the same. Fig. 3 is a side view of one of the guards with the guard plate for the spring removed. Fig. 4 is a view in side elevation of one of the guards partly broken away, showing the inner face of such guard, and, Fig. 5 is a vertical sectional view through one of the guards, partly broken away.

In the drawings, 10 indicates the trolley harp having arms 11 in which the journal pin 12 for the trolley wheel 14 is mounted in the usual manner.

My invention resides in providing a pair of guards, one of which is attached to each arm of the trolley harp and which guards are of identical construction, except that one is right and the other left. The same reference numerals will be applied however, to each guard. These guards each comprise a plate 15 suitably secured, as by bolts or screws 16, to the trolley harp. The upper end of this plate is rounded as at 17 and at the termination of the rounded portions are shoulders 18, 19, respectively.

Pivotally secured to the upper end or rounded portion of the plate 15 is a guard arm 20, which works on said rounded portion, its lower end being cut-away so that the inner face of the guard arm 20 and the inner face of the plate 15 are on the same plane. The pivot pin 21 for said guard arm 20 as best seen in Fig. 5, is provided intermediate its ends with a squared portion 22 on which is mounted a plate 23, and to which squared portion is secured one end of a spring 24, the other end of which is secured to a pin 25 carried by the guard arm 20. The plate 23 is secured to the plate 15 in any desirable manner as by screws 26 and is formed with a square opening to receive the squared portion 22 of the pin 21, to prevent turning of the pin.

Mounted on the pin 21 outside the squared portion 22 is a guard plate or disk 27 which is held in position in any desirable manner as by a nut 28 on the outer end of the pin. In practice, the pin 21 is inserted through the members 15, 20, and then riveted on its inner end so that the said inner end thereof will be flush with the inner face of said members.

In practice, when the guard arms 20 strike an intersecting wire, they rock on their pivots rearwardly so as to allow the trolley wheel to pass such wire, being limited in their rearward movement by the shoulder 19, and immediately on passing the wire, are returned to their normal position at opposite sides of the trolley wire, by the action of the springs 24, their movement in returning to normal position being limited by shoulders 18. Should one or the other of the springs 24 be broken, access can be readily had thereto for renewal. As the device makes no alteration in the trolley harp *per se*, it may be readily applied to the usual type of harp now in use.

Having fully described my invention, what I claim as new and desire to secure by Letters Patent is:—

A trolley guard comprising a pair of guard members, each embodying a plate having a rounded upper end and provided on its side edges with stop shoulders at the termination of the rounded portion, a guard arm pivoted to said upper end of the plate and cut-away at its lower end to form a rounded portion working on the rounded portion of the plate, a securing pin carried by the guard arm, and having a squared portion, a spring coiled on the squared portion of the pivot pin having one end connected thereto, and its other end connected to a securing pin on the guard arm, and a plate secured to said rounded plate, and having a square opening to receive the squared portion of the pin.

In testimony whereof I affix my signature in presence of two witnesses.

ROMAN DAC.

Witnesses:
  GEORGE FESKO,
  JOHN SHAFRAU.